United States Patent
Wakisaka et al.

(10) Patent No.: US 12,330,240 B2
(45) Date of Patent: Jun. 17, 2025

(54) HOUSING AND HANDLING METHOD FOR PROCESSING DEVICE

(71) Applicant: HONDA MOTOR CO., LTD., Tokyo (JP)

(72) Inventors: Taisei Wakisaka, Tochigi-ken (JP); Yoshinao Shigehara, Tochigi-ken (JP); Katsuhiro Hirayama, Tochigi-ken (JP); Yukio Shiono, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 799 days.

(21) Appl. No.: 17/617,317

(22) PCT Filed: Jun. 2, 2020

(86) PCT No.: PCT/JP2020/021819
§ 371 (c)(1),
(2) Date: Dec. 8, 2021

(87) PCT Pub. No.: WO2020/250755
PCT Pub. Date: Dec. 17, 2020

(65) Prior Publication Data
US 2022/0226936 A1 Jul. 21, 2022

(30) Foreign Application Priority Data
Jun. 11, 2019 (JP) ................................. 2019-108436

(51) Int. Cl.
*B23K 26/70* (2014.01)
*B23K 26/08* (2014.01)
(Continued)

(52) U.S. Cl.
CPC .......... *B23K 26/705* (2015.10); *B23K 26/142* (2015.10); *B23K 26/21* (2015.10); *B23K 26/0884* (2013.01)

(58) Field of Classification Search
CPC .... B23K 26/705; B23K 26/142; B23K 26/21; B23K 26/0884
(Continued)

(56) References Cited

U.S. PATENT DOCUMENTS

2017/0050267 A1    2/2017  Kung et al.

FOREIGN PATENT DOCUMENTS

DE          2950657 A1 *  4/1988  ........... B23K 26/032
JP       2002-005737          1/2002
(Continued)

OTHER PUBLICATIONS

Machine Translation of DE2950657A1 (Year: 2024).*
(Continued)

*Primary Examiner* — Steven W Crabb
*Assistant Examiner* — Thomas J Ward
(74) *Attorney, Agent, or Firm* — Amin, Turocy & Watson, LLP

(57) ABSTRACT

Provided are a housing and a handling method for a processing device that can prevent the adherence of dust particles and the like on a sensor. A housing accommodates a sensor that detects an energy beam. The housing comprises: a chamber provided with a transparent member through which the energy beam can pass; and a supply port for supplying gas into the chamber. The sensor detects an energy beam incident thereon via the transparent member.

5 Claims, 3 Drawing Sheets

(51) Int. Cl.
*B23K 26/142* (2014.01)
*B23K 26/21* (2014.01)

(58) Field of Classification Search
USPC .................................................. 219/121.83
See application file for complete search history.

(56) References Cited

FOREIGN PATENT DOCUMENTS

| | | | |
|---|---|---|---|
| JP | 5868118 | 2/2016 | |
| JP | WO-2018169049 A1 * | 9/2018 | ........... B23K 26/032 |
| WO | 2015129249 | 9/2015 | |

OTHER PUBLICATIONS

Machine Translation of WO2018169049 (Year: 2024).*
International Search Report and Written Opinion for International Application No. PCT/JP2020/021819 mailed on Sep. 1, 2020, 9 pages.

* cited by examiner

HOUSING AND HANDLING METHOD FOR PROCESSING DEVICE

TECHNICAL FIELD

The invention relates to a housing and a handling method for a processing device.

BACKGROUND ART

JP 5868118 B2 discloses a laser processing device provided with a dust discharge means for sucking and discharging dust generated in the vicinity of a processing point by a laser beam directed to a workpiece. In JP 5868118 B2, the output of the laser beam is measured by a thermal output measuring means in a state where a blower provided in a dust treatment apparatus connected to a dust discharge means is driven.

SUMMARY OF THE INVENTION

However, with the technique described in JP 5868118 B2, it is not always possible to sufficiently suppress the adhesion of dust or the like to the output measuring means. If dust or the like adheres to the output measuring means, the output of the laser beam cannot be satisfactorily detected.

An object of the present invention is to provide a housing and a handling method for a processing device capable of suppressing adhesion of dust or the like to a sensor.

According to an aspect of the present invention, there is provided a housing accommodating a sensor that detects an energy beam, the housing including: a chamber provided with a beam-transparent member that allows the energy beam to pass; and a supply port that supplies a gas into the chamber, wherein the sensor detects the energy beam incident through the beam-transparent member.

According to another aspect of the present invention, there is provided a handling method for a processing device including: an irradiation unit that outputs an energy beam; a housing including a chamber provided with a beam-transparent member that allows the energy beam to pass; and a sensor that is accommodated in the housing and detects the energy beam incident through the beam-transparent member. The chamber is partitioned by a partition plate provided with the beam-transparent member. The beam-transparent member is attached to the partition plate in a replaceable manner. The partition plate is slid, whereby the beam-transparent member is pulled out of the housing and replaced.

According to the present invention, it is possible to provide a housing and a handling method for a processing device capable of satisfactorily suppressing adhesion of dust or the like to a sensor.

DESCRIPTION OF THE INVENTION

The housing and the handling method for a processing device according to the invention will be explained in more detail below by way of preferred embodiments and with reference to the accompanying drawings.

Embodiment

Figure 1:
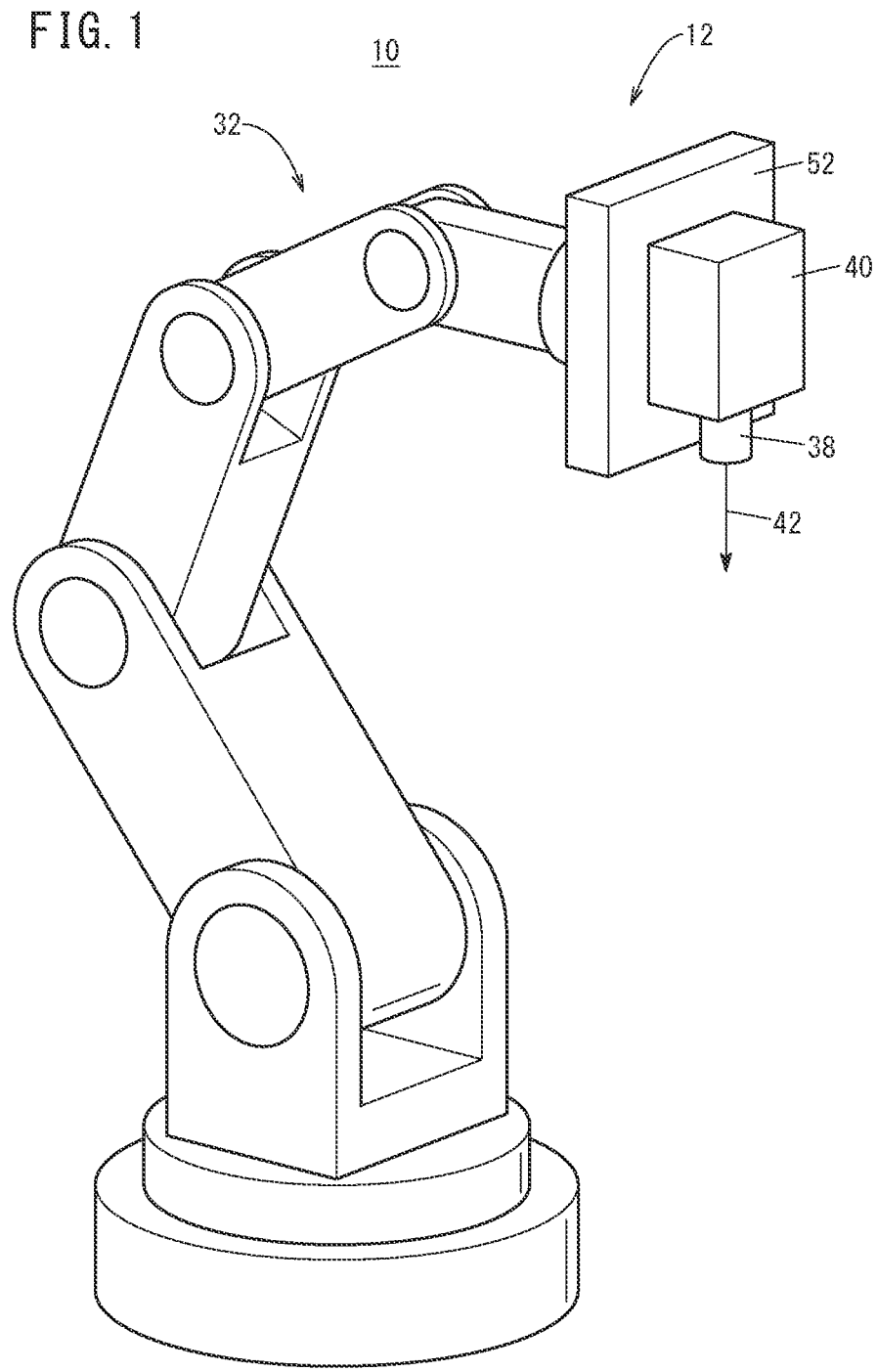
FIG. 1 is a perspective view showing an irradiation device provided for a processing device according to an embodiment.

A housing and a handling method for a processing device according to an embodiment will be described with reference to the drawings. FIG. 1 is a perspective view showing an irradiation device provided for a processing device according to the present embodiment.

As shown in FIG. 1, the processing device 10 according to the present embodiment includes an irradiation device 12 and a transport mechanism 32 that transports the irradiation device 12.

The irradiation device 12 includes an energy beam generation unit (not illustrated), an irradiation unit 38 that irradiates an object with an energy beam 42 output from the energy beam generation unit, and a holding unit 40 that holds the irradiation unit 38. The energy beam 42 is, for example, a laser beam, but is not limited thereto.

The transport mechanism 32 is configured by, for example, an articulated robot, but is not limited thereto. A support frame 52 that supports the holding unit 40 is provided at the distal end portion of the transport mechanism 32. By irradiating the object with the energy beam 42 output from the irradiation unit 38 while moving the irradiation unit 38 by the transport mechanism 32, the object is processed.

Figure 2:
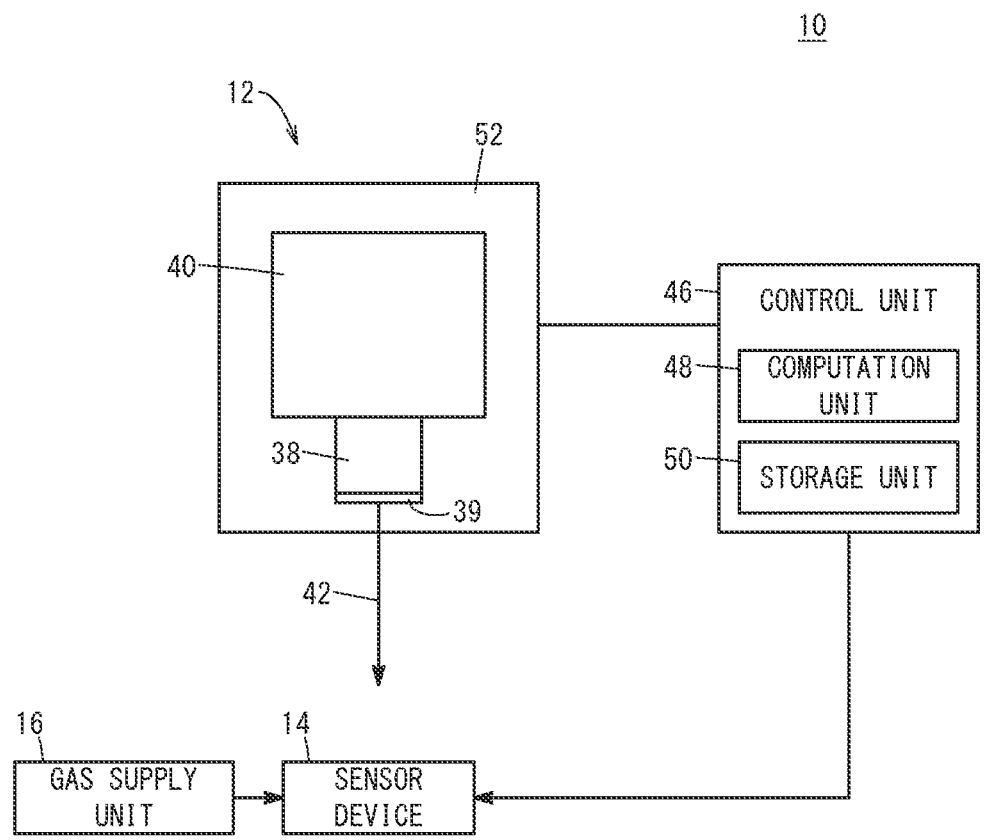
FIG. 2 is a schematic view showing a processing device according to an embodiment.

FIG. 2 is a schematic view showing the processing device according to the present embodiment. As shown in FIG. 2, the processing device 10 according to the present embodiment further includes a sensor device 14, a gas supply unit 16, and a control unit 46. FIG. 2 shows part of the irradiation device 12.

The control unit 46 governs the overall control of the processing device 10. The control unit 46 includes a computation unit 48 and a storage unit 50. The computation unit 48 can be configured by, for example, a central processing unit (CPU) or the like, but is not limited thereto. The storage unit 50 includes a volatile memory (not shown) and a nonvolatile memory (not shown). Examples of the volatile memory include a random access memory (RAM) or the like. Examples of the nonvolatile memory include a read only memory (ROM), a flash memory, or the like. Programs, data, and the like can be stored in the storage unit 50.

The sensor device 14 can be used in an inspection for determining the intensity of the energy beam 42 output from the irradiation unit 38. In order to ensure machining accuracy, such inspection can be performed before machining of a workpiece is performed by the processing device 10. In the inspection of the intensity of the energy beam 42, the control unit 46 controls the irradiation device 12 so that the energy beam 42 is output from the irradiation unit 38. The energy beam 42 output from the irradiation unit 38 is detected by the sensor device 14. The sensor device 14 outputs a signal indicating the detected intensity of the energy beam 42 to the control unit 46. The control unit 46 determines whether or not the intensity of the energy beam 42 is within a predetermined range.

When the intensity of the energy beam 42 output from the irradiation unit 38 is within the predetermined range, the intensity of the energy beam 42 is normal. In such a case, the control unit 46 controls the processing device 10 to perform processing on the object.

On the other hand, when the intensity of the energy beam 42 output from the irradiation unit 38 is outside the predetermined range, the intensity of the energy beam 42 is abnormal. In such a case, the control unit 46 issues a notification for prompting a user to perform maintenance or the like on the processing device 10. In the maintenance of the processing device 10, a beam-transparent member 24 (see FIG. 3A) described later may be replaced, the intensity of the energy beam 42 may be adjusted, or a protective glass (beam-transparent member) 39 provided for the irradiation unit 38 may be replaced.

The gas supply unit 16 supplies a gas into a chamber 18A (see FIG. 3A) described later. As will be described later, the chamber 18A is configured by part of a housing 18 (see FIG. 3A) provided for the sensor device 14. When dust (welding fume) or the like enters of the chamber 18A, the dust or the like may adhere to a light receiving portion 22 (see FIG. 3A) of a sensor 20 (see FIG. 3A) described later. Therefore, the gas supply unit 16 continuously supplies the gas into the chamber 18A so that dust or the like does not enter the chamber 18A. Note that the gas is, for example, air, but is not limited thereto. A nonflammable gas or the like may be used as appropriate.

Figure 3A:
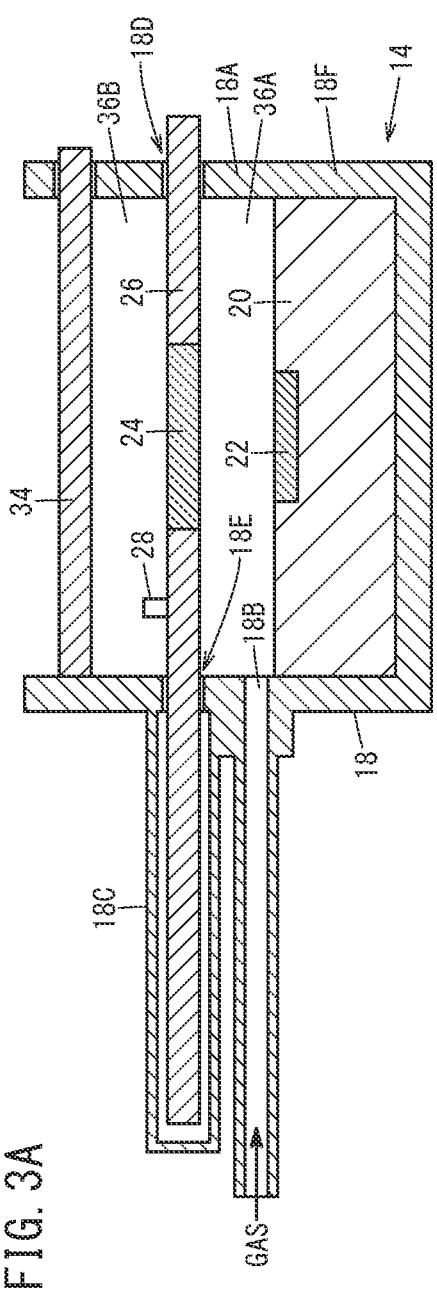
FIG. 3A and FIG. 3B are cross-sectional views showing a sensor device according to an embodiment.
Figure 3B:
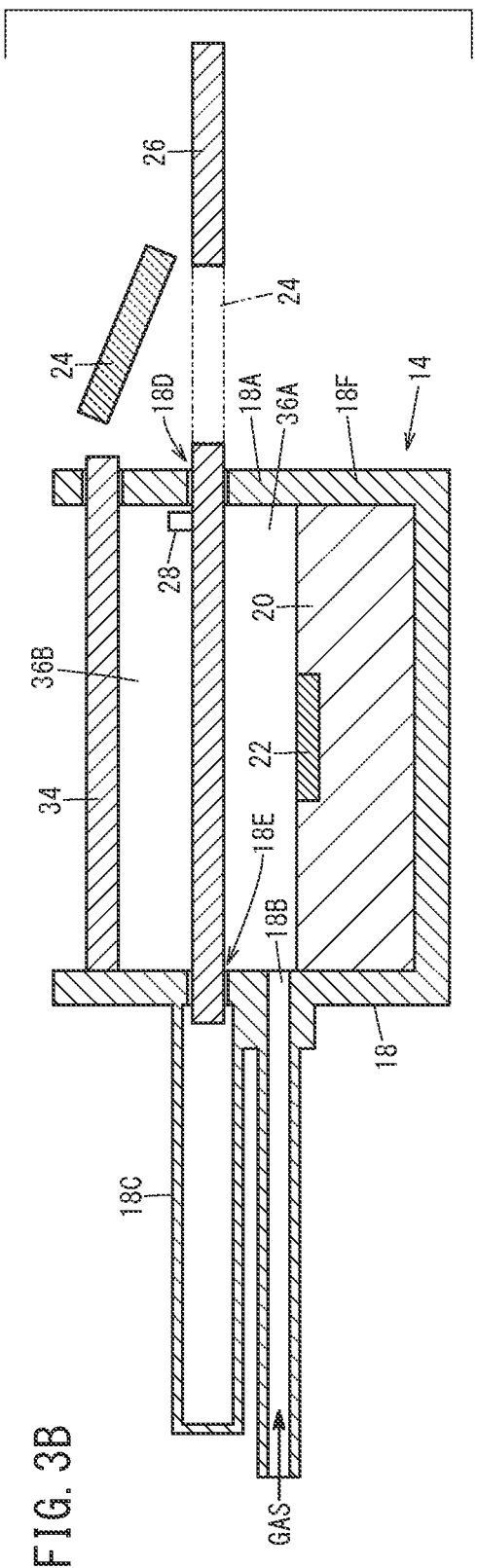

FIGS. 3A and 3B are cross-sectional views showing the sensor device according to the present embodiment. FIG. 3A shows a state in which a partition plate 26 has not yet been slid. That is, FIG. 3A shows a state in which the position of the partition plate 26 is set such that the beam-transparent member 24 and the sensor 20 overlap each other in plan view. FIG. 3B shows a state in which the beam-transparent member 24 has been pulled out of the housing 18 by sliding the partition plate 26.

As shown in FIG. 3A, the sensor device 14 includes a housing 18 and a sensor (detector, power meter) 20 accommodated in the housing 18. The sensor 20 includes a light receiving portion 22. The light receiving portion 22 is located, for example, on the upper surface of the sensor 20. The light receiving portion 22 receives an energy beam 42 (see FIG. 2) incident via the beam-transparent member 24 described later. The sensor 20 outputs a signal indicating the intensity of the energy beam 42 incident on the light receiver 22.

Part of the housing 18 constitutes a chamber 18A. To be more specific, the chamber 18A is formed by a portion of the housing 18 that is located above a portion in which the sensor 20 is accommodated.

The housing 18 is formed with insertion ports (slits, insertion portions) 18D, 18E for inserting the partition plate 26. The insertion port 18D is located on one side (right side on the surface of FIG. 3A) with respect to the chamber 18A. The insertion port 18E is located on the other side (left side on the surface of FIG. 3A) with respect to the chamber 18A. A chamber 18A is partitioned by the partition plate 26 one end side of which is inserted into insertion port 18D and the other end side of which is inserted into the insertion port 18E. The partition plate 26 is provided between the sensor 20 and a shutter 34 described later.

The partition plate 26 is provided with the beam-transparent member 24 that allows the energy beam 42 to pass. The beam-transparent member 24 is attached to the partition plate 26 in a replaceable manner. The beam-transparent member 24 is formed of, for example, glass, but is not limited thereto.

The partition plate 26 can be slid, for example, in the horizontal direction. The partition plate 26 is provided with a stopper 28 for limiting the sliding amount of the partition plate 26. Since the partition plate 26 is provided with the stopper 28, an opening can be prevented from being formed when the partition plate 26 is slid. Therefore, it is possible to prevent contaminated air containing dust from entering a space 36A defined by the partition plate 26, the sensor 20, and the partition wall 18F of the housing 18. That is, it is possible to prevent contaminated air containing dust from entering the chamber 18A.

The housing 18 further includes a shutter 34 that automatically opens and closes. The shutter 34 may be opened and closed by an opening/closing mechanism (not shown). The shutter 34 is located above the partition plate 26. The shutter 34 is opened with the sole purpose of detecting the intensity of the energy beam 42. Except a case where the detection of the intensity of the energy beam 42 is the purpose, the shutter 34 is closed. Therefore, it is possible to prevent dust generated when the object is processed from adhering to the light receiving portion 22 of the sensor 20.

The housing 18 is further provided with a supply port 18B for supplying gas into the chamber 18A. The supply port 18B is formed at a position lower than the position where the partition plate 26 is provided. Therefore, the gas is supplied through the supply port 18B into the space 36A defined by the partition plate 26, the sensor 20, and the partition wall 18F of the housing 18. That is, the gas is supplied into the chamber 18A via the supply port 18B. Since the gas is supplied into the chamber 18A, pressure inside the chamber 18A is higher than pressure outside the chamber 18A. The pressure outside the chamber 18A is, for example, atmospheric pressure, and the pressure inside the chamber 18A becomes higher than the atmospheric pressure. The gas supplied into the chamber 18A flows out of the chamber 18A through a clearance, for example, between the partition wall 18F of the housing 18 and the bottom surface of the partition plate 26, and the gas flow in the clearance is relatively fast because the clearance is small. Therefore, it is possible to prevent dust or the like from entering the chamber 18A through the clearance, and it is possible to prevent dust or the like from adhering to the light receiving portion 22 of the sensor 20.

The housing 18 is further provided with an accommodation portion 18C for accommodating part of the partition plate 26 projecting out from the housing 18. The accommodation portion 18C and the housing 18 may be integrally formed, or the accommodation portion 18C and the housing 18 may be configured by separate members.

In the state shown in FIG. 3A, the gas supplied into the chamber 18A flows out of the chamber 18A through the clearance between the partition wall 18F of the housing 18 and the lower surface of the partition plate 26, and the clearance is small. Therefore, the gas flow in the clearance is relatively fast. Therefore, entry of dust or the like into the chamber 18A is suppressed, and the inside of the chamber 18A is kept clean. On the other hand, no gas is supplied into a space 36B defined by the partition plate 26, the shutter 34, and the partition wall 18F of the housing 18. Therefore, dust or the like may enter the space 36B through a clearance between the partition wall 18F of the housing 18 and the upper surface of the partition plate 26. In addition, dust or the like may enter the space 36B through a clearance or the like between the partition wall 18F of the housing 18 and the lower surface of the shutter 34.

When the partition plate 26 is slid and thus the beam-transparent member 24 is pulled out of the housing 18, the state shown in FIG. 3B is obtained. In the present embodiment, the accommodation portion 18C is set to be long. That is, in the present embodiment, the horizontal dimension of the accommodation portion 18C is set to be long. In the present embodiment, the length of the partition plate 26 is set to be long. That is, in the present embodiment, the horizontal dimension of the partition plate 26 is set to be long. Therefore, even when the partition plate 26 has been slid and thus the beam-transparent member 24 has been pulled out of the housing 18, the following state is maintained. That is, a state in which one end of the partition plate 26 protrudes from one side of the housing 18 and the other end of the partition plate 26 protrudes from the other side of the housing 18 is maintained. Since the partition plate 26 is provided with the stopper 28, the partition plate 26 is not slid until an opening is formed between the partition plate 26 and the partition wall 18F of the housing 18. In the present embodiment, since an opening is not formed when the beam-transparent member 24 is pulled out from the housing 18, dust or the like that has entered the space 36B is prevented from entering the housing 18.

In the present embodiment, the beam-transparent member 24 is replaced in the following manner. That is, the partition plate 26 is slid while a state is maintained in which one end of the partition plate 26 protrudes from one side of the housing 18 and the other end of the partition plate 26 protrudes from the other side of the housing 18. Since the partition plate 26 is provided with the stopper 28, no opening is formed between the partition plate 26 and the partition wall 18F of the housing 18. In this way, the beam-transparent member 24 is withdrawn from the housing 18. Thereafter, the beam-transparent member 24 is replaced.

As described above, according to the present embodiment, since the gas is supplied into the chamber 18A via the supply port 18B, the pressure inside the chamber 18A becomes higher than the pressure outside the housing 18, and the gas flows from the inside of the chamber 18A to the outside of the chamber 18A. Therefore, according to the present embodiment, it is possible to prevent dust or the like generated during processing from entering the chamber 18A, and consequently, it is possible to prevent dust or the like from sticking to the light receiving portion 22 of the sensor 20.

In addition, in the present embodiment, the beam-transparent member 24 is replaced while the shutter 34 is closed. For this reason, according to the present embodiment, the pressures in the spaces 36A and 36B become higher than the pressure outside the housing 18, and thus a gas flow from the inside of the housing 18 to the outside of the housing 18 occurs; therefore it is possible to suppress the entry of dust or the like into the housing 18. Moreover, in the present embodiment, since the partition plate 26 is provided with the stopper 28, an opening is not formed when the partition plate 26 is slid. Therefore, according to the present embodiment, it is possible to prevent dust or the like from entering the chamber 18A, and consequently, it is possible to prevent dust or the like from adhering to the light receiving portion 22 of the sensor 20.

Moreover, according to the present embodiment, a seal member such as a packing is unnecessary. That is, according to the present embodiment, a complicated dust-proof structure is unnecessary. As the gas supplied into the chamber 18A through the supply port 18B, air obtained by purifying compressed air generally provided in a factory or the like may be used. Therefore, according to the present embodiment, it is possible to easily suppress the adhesion of dust or the like to the light receiving portion 22 of the sensor 20.

Moreover, according to the present embodiment, the partition plate 26 is slid while the state is maintained in which one end of the partition plate 26 protrudes from one side of the housing 18 and the other end of the partition plate 26 protrudes from the other side of the housing 18. Therefore, according to the present embodiment, dust or the like that has entered the space 36B can reliably be prevented from entering the housing 18, and consequently, it is possible to reliably prevent dust or the like from adhering to the light receiving portion 22 of the sensor 20.

Although preferred embodiments of the present invention have been described above, the present invention is not limited to the above-described embodiments, and various modifications can be made thereto without departing from the essence and gist of the present invention.

For example, a slight opening may be formed when the partition plate 26 is slid. If the opening is small, the gas flows from the inside of the space 36A to the inside of the space 36B at a certain speed through the opening. Therefore, dust or the like present in the space 36B is less likely to enter the space 36A. That is, if the opening is small, the gas flows from the inside of the space 36A to the inside of the space 36B at a certain speed through the opening. Therefore, dust and the like present in the space 36B is less likely to enter the chamber 18A. Therefore, it is possible to prevent dust or the like from entering the chamber 18A, and consequently to prevent dust or the like from adhering to the light receiving portion 22 of the sensor 20.

In addition, in the above-described embodiment, the case has been described as an example where the partition plate 26 is slid in a state in which the gas is being supplied into the chamber 18A through the supply port 18B, whereby the beam-transparent member 24 is pulled out of the housing 18 and the beam-transparent member 24 is replaced. However, the embodiment is not limited thereto. When the outside air of the housing 18 is clean, the beam-transparent member 24 may be replaced in a state where the gas is not being supplied into the chamber 18A via the supply port 18B.

The above embodiments are summarized as follows.

The housing (18) accommodates a sensor (20) that detects an energy beam (42), and includes a chamber (18A) provided with a beam-transparent member (24) that allows the energy beam to pass, and a supply port (18B) that supplies a gas into the chamber wherein the sensor detects the energy beam incident through the beam-transparent member. According to such a configuration, since the gas is supplied into the chamber through the supply port, the pressure in the chamber becomes higher than the pressure outside the housing, and the gas flows from the inside of the chamber to the outside of the chamber. Therefore, according to such a configuration, it is possible to prevent dust or the like generated outside the housing from entering the chamber, and thus it is possible to prevent dust or the like from adhering to the sensor.

The chamber may be partitioned by a partition plate (26) provided with the beam-transparent member.

The beam-transparent member may be attached to the partition plate in a replaceable manner, and the partition plate is slid, whereby the beam-transparent member may be pulled out of the housing. According to such a configuration, the partition plate is slid, whereby the beam-transparent member can be pulled out of the housing and be easily replaced.

The partition plate may include a stopper (28) that limits a sliding amount of the partition plate. According to such a configuration, it is possible to prevent an opening from being created for the chamber when the partition plate is slid, whereby it is possible to more reliably prevent dust or the like from entering the chamber and it is possible to more reliably prevent dust or the like from adhering to the sensor.

In a state where the partition plate has been slid and thus the beam-transparent member has been pulled out of the housing, one end of the partition plate may protrude from one side of the housing, and another end of the partition plate may protrude from another side of the housing. According to such a configuration, it is possible to more reliably suppress entry of dust or the like into the chamber when the partition plate is slid, and consequently, it is possible to more reliably suppress sticking of dust or the like to the sensor.

When the beam-transparent member is replaced, the gas may continue to be supplied into the chamber through the supply port. According to such a configuration, it is possible to prevent dust or the like from entering the chamber when the beam-transparent member is replaced, and thus it is possible to prevent dust or the like from sticking to the sensor.

The energy beam may be a laser beam.

A handling method for a processing device (10) includes: an irradiation unit (38) that outputs an energy beam; a housing that includes a chamber provided with a beam-transparent member that allows the energy beam to pass; and a sensor that is accommodated in the housing and detects the energy beam incident through the beam-transparent member, the handling method including partitioning the chamber with a partition plate provided with the beam-transparent member, attaching the beam-transparent member to the partition plate in a replaceable manner, and sliding partition plate, whereby the beam-transparent member is pulled out of the housing and is replaced. According to such a configuration, it is possible to prevent dust or the like generated outside the housing from entering the chamber, and thus it is possible to prevent dust or the like from adhering to the sensor.

The processing device may further include a gas supply unit (16) that supplies a gas into the chamber through a supply port provided for the chamber, and in a state in which the gas is supplied into the chamber through the supply port, the partition plate is slid, whereby the beam-transparent member may be pulled out of the housing and is replaced.

The housing may include a shutter (34) that automatically opens and closes, the partition plate may be located between the shutter and the sensor, and the transparent member may be replaced while the shutter is closed. According to such a configuration, it is possible to more reliably prevent dust or the like from entering the housing.

While a state is maintained in which one end of the partition plate protrudes from one side of the housing and another end of the partition plate protrudes from another side of the housing, the partition plate is slid, whereby the beam-transparent member may be pulled out of the housing and replaced. According to such a configuration, it is possible to more reliably prevent dust or the like from entering the housing.

REFERENCE SIGNS LIST

10 . . . processing device
12 . . . irradiation device
14 . . . sensor device
16 . . . gas supply unit
18 . . . housing
18A . . . chamber
18B . . . supply port
18C . . . accommodation portion
18D, 18E . . . insertion port
18F . . . partition wall
20 . . . sensor
22 . . . light receiving portion
24 . . . beam-transparent member
26 . . . partition plate
28 . . . stopper
32 . . . transport mechanism
34 . . . shutter
36A, 36B . . . space
38 . . . irradiating portion
39 . . . protective glass
40 . . . holding unit
42 . . . energy beam
46 . . . control unit
48 . . . computation unit
50 . . . storage unit
52 . . . support frame

What is claim is:

1. A housing accommodating a sensor that detects an energy beam, the housing comprising:
   a chamber provided with a beam-transparent member that allows the energy beam to pass; and
   a supply port that supplies a gas into the chamber;
   wherein the sensor detects the energy beam incident through the beam-transparent member,
   the chamber is partitioned by a partition plate provided with the beam-transparent member,
   the beam-transparent member is attached to the partition plate in a replaceable manner,
   the partition plate is slid, whereby the beam-transparent member is pulled out of the housing,
   the partition plate includes a stopper that limits a sliding amount of the partition plate, and
   in a state in which the partition plate has been slid and thus the beam-transparent member has been pulled out of the housing, one end of the partition plate protrudes from one side of the housing and another end of the partition plate protrudes from another side of the housing.

2. The housing according to claim 1, wherein
   when the beam-transparent member is replaced, the gas continues to be supplied into the chamber through the supply port.

3. The housing according to claim 1, wherein
   the energy beam is a laser beam.

4. A handling method for a processing device including an irradiation unit that outputs an energy beam, a housing that includes a chamber provided with a beam transparent member that allows the energy beam to pass, and a sensor that is accommodated in the housing and detects the energy beam incident through the beam transparent member, the handling method comprising:
   partitioning the chamber with a partition plate provided with the beam-transparent member,
   attaching the beam-transparent member to the partition plate in a replaceable manner, and
   sliding the partition plate, whereby the beam-transparent member is pulled out of the housing and is replaced,
   wherein the housing includes a shutter that automatically opens and closes,
   the partition plate is positioned between the shutter and the sensor,
   the beam-transparent member is replaced in a state where the shutter has been closed,
   while a state is maintained in which one end of the partition plate protrudes from one side of the housing and another end of the partition plate protrudes from another side of the housing, the partition plate is slid, whereby the beam-transparent member is pulled out of the housing and is replaced.

5. The handling method according to claim 4, wherein
   the processing device further includes a gas supply unit that supplies a gas into the chamber through a supply port provided for the chamber, and in a state in which the gas is supplied into the chamber through the supply port, the partition plate is slid, whereby the beam-transparent member is pulled out of the housing and is replaced.

* * * * *